ROTARY STORAGE RECEPTACLE FOR DISK-LIKE OBJECTS

Filed Sept. 24, 1948 2 SHEETS—SHEET 1

INVENTOR.
FLORIAN K. MARTINI
BY Robert W. Fulwider
Attorney

ROTARY STORAGE RECEPTACLE FOR DISK-LIKE OBJECTS

Filed Sept. 24, 1948 2 SHEETS—SHEET 2

INVENTOR.
FLORIAN K. MARTINI
BY Robert W. Fulwider
Attorney

Patented Jan. 8, 1952 2,581,547

UNITED STATES PATENT OFFICE 2,581,547

ROTARY STORAGE RECEPTACLE FOR DISKLIKE OBJECTS

Florian K. Martini, Los Angeles, Calif.

Application September 24, 1948, Serial No. 51,082

In Great Britain September 26, 1947

3 Claims. (Cl. 312—11)

The invention relates to receptacles for storing disc like objects such as gramophone records.

According to the invention, a storage receptacle of the type specified is adapted to store a number of layers of discs such that any disc is withdrawable and replaceable without disturbing the relative position of the other discs. Each layer contains an equal number of discs equally spaced and coplanar with respect to each other. Furthermore the individual discs contained in each layer are staggered with respect to the discs contained in the layers on either side of said layer, the arrangement preferably being such that all the even layers are identical in all respects, and all the odd layers are identical in all respects.

According to another aspect of the invention the receptacle for the discs is built up of a number of identical elements of sheet material having their bounding edges or parts thereof shaped to the curvature or outline shape of the discs. The said elements are preferably built up in superimposed equal horizontal layers, and the odd layers being symmetrically staggered with respect to the even layers and vice versa.

An example of a storage receptacle according to the invention will now be described with reference to the accompanying drawings.

In the drawings Figure 1 is a plan view, in part section, of a gramophone record filing cabinet.

Figures 1, 3, 4:
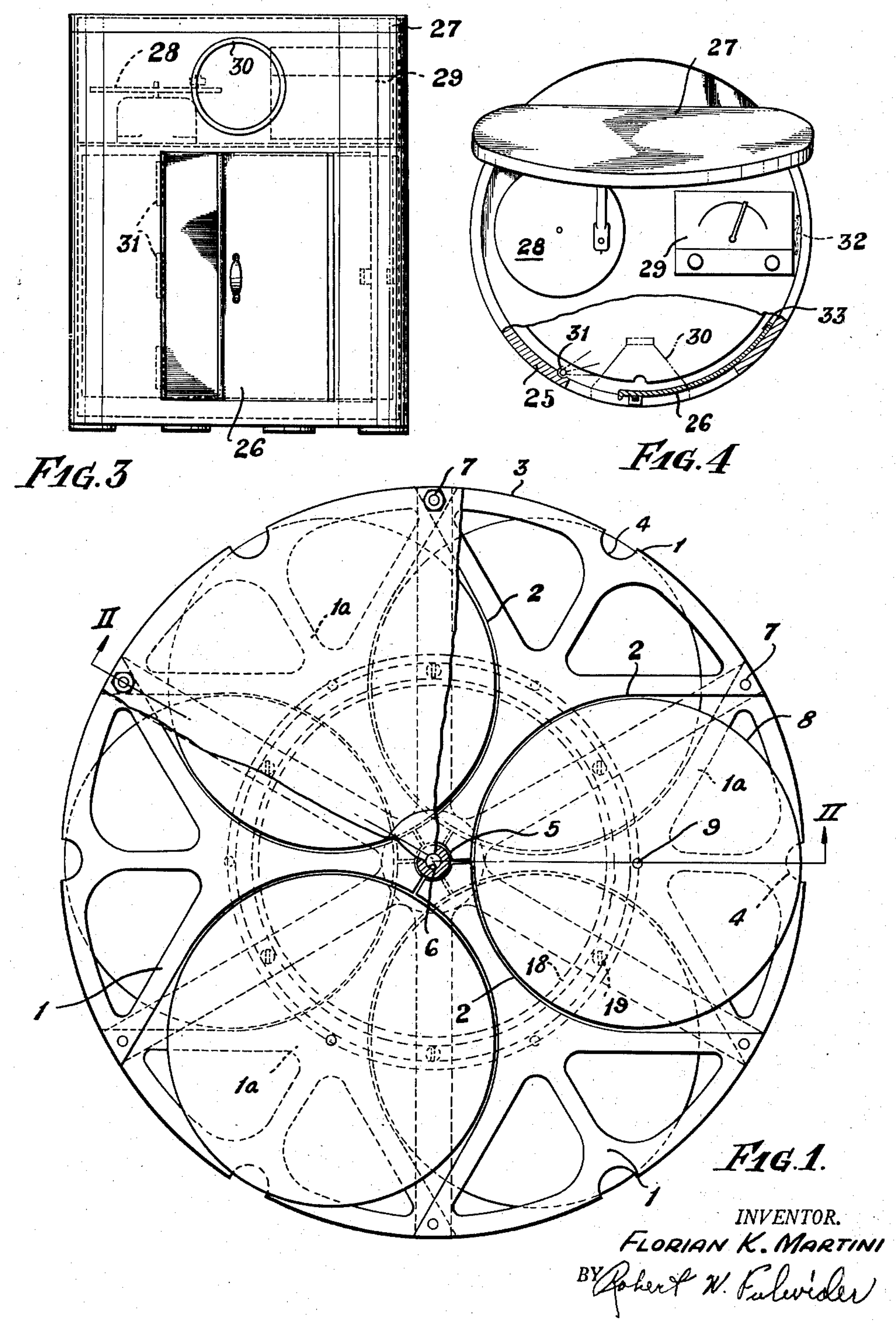
Figures 3 and 4 are diagrammatic representations of an elevation and plan respectively of the record filing cabinet combined with a radio.
Figure 2:
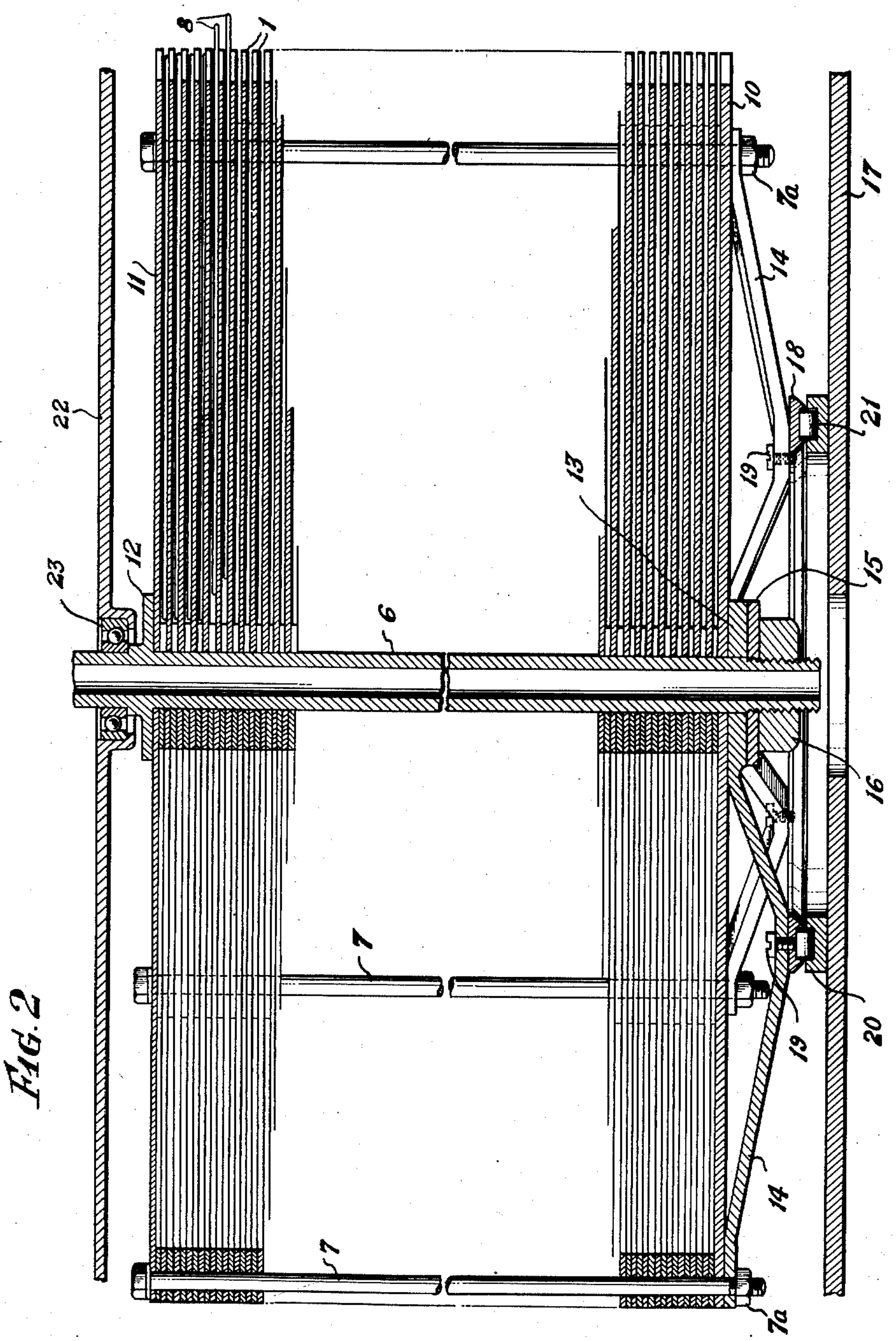
Figure 2 is a sectional elevation on line II—II of Figure 1 on a larger scale.

Referring now to Figures 1 and 2, the filing cabinet is built up of a number of equal sector plates 1 of sheet material, which may be of a light alloy such as that known under the trade name "Duralumin."

The sector plates 1 are assembled in superimposed equal layers. The layer as shown in Figure 1 comprises three sector plates arranged in a common plane at 120°. Each sector plate has two bounding edges 2 the inner portions of which are parts of circles and the outer portions of which are straight lines. The outer edge 3 of the sector has a central notch 4 to facilitate withdrawal of the record. The innermost edge 5 of each sector is arcuate and slightly spaced away from a central spindle 6. The central portions of the sector plates are cut away as shown in Figure 1 to decrease the weight of the sector without substantially reducing its rigidity and strength. The thickness of the sector plate is slightly greater than that of the gramophone record, and to reduce friction each side of the sector may be coated with a thin layer of material which will prevent scratching of the record.

Adjacent layers of the sectors 1 are identical in all respects, but the sectors in adjacent layers are staggered by 60° as shown in Figure 1 i. e. the sectors of all the odd layers are staggered with respect to those of the even layers. The sectors of the next succeeding lower layer are indicated by 1*a*, Figure 1. The sectors of alternate layers overlap at the periphery and are secured together by bolts 7. In Figure 1 the record 8 with its centre at 9, is shown in position in a pocket the base of which is formed by the lower sector 1*a* and the sides of which are formed by the edges 2 of adjacent sectors. The straight portions of the edges 2 are parallel and the slot is of slightly greater dimensions that the diameter of the record as shown in order to allow easy withdrawal and insertion of the record. The top of the pocket will be formed by another sector above and similar to 1*a*.

Figure 2 shows how the sectors are assembled in parallel layers around the central spindle 6. The sectors 1 are assembled with the spindle 6 in the reverse position to that shown in Figure 2. The end plate 11 resting against the integral flange 12 formed on the spindle 6 then forms the base of the pile. After the desired number of layers of sectors have been assembled they are covered by the end plate 10, which like the plate 11 has a central hole for the spindle 6 and peripheral holes for the bolts 7. Six radial arms 14 bored for bolts 7 and connected to a central flange 13 are then assembled to the spindle. Washer 15 and nut 16 are applied over the threaded end of the spindle 6, and nuts 7*a* are applied to the bolts 7. The sectors are thereby secured in the correct relationship both in the vertical and the horizontal planes.

The assembly is rotatable in a fixed casing on upper and lower bearings. The lower bearing comprises a movable track 18 rigidly secured to the radial arms 14 by screws 19, a fixed track 20 secured to the fixed base plate 17 and roller bearings 21 located between the fixed and movable tracks.

The upper bearing comprises a ball race 23 located between the flanged upper casing 22 and the spindle 6.

Figures 3 and 4 show diagrammatically a combined record filing cabinet and radio. The assembly such as that already described with reference to Figures 1 and 2 is housed in a cylindrical cabinet 25 having a sliding door 26. The cabinet has a hinged lid 27, and the upper portion of the cabinet encloses a turntable 28, radio chassis 29, and loudspeaker 30. A row of electric lamps 31 are arranged inside the door surround and are adapted to be switched on by an electric circuit comprising a fixed contact 32 and a contact 33 carried at the edge of the door 26.

To facilitate withdrawal of the records a pair of tweezers or grippers may be employed adapted for insertion in the notches 4. Such tweezers will be provided with jaws covered with rubber or other resilient non-slipping material, and provided with teeth or corrugations shaped to provide a frictional grip in the direction of withdrawal.

When the filing cabinet is designed to house a large number of records, it may be rotated by an electric motor housed in the base of the cabinet. Reduction gearing and a motor starting circuit of known type may be employed for this purpose.

The arrangement described above may be varied by varying the number of records in each layer, for example six instead of three. The employment of separate sectors makes for economy of material, but it is also possible to make each partition of a single stamping of sheet metal instead of in separate sectors.

Having now particularly described and ascertained the nature of my said invention, and in what manner the same is to be performed, I declare that what I claim is:

1. A storage receptacle for disc-like objects which includes: a first set of supporting members, each of said members being generally circular in shape with a plurality of pockets therein each adapted to receive one of said disc-like objects, said pockets constituting the major portion of each of said supporting members, and terminating outwardly of the center of said supporting members, each of said members having spacing portions between said pockets; a second set of supporting members identical to said first set but angularly offset therefrom so that said pockets of said second set of supporting members are midway between pockets of said first set of supporting members, the members of said first set being alternated with the members of said second set, with the spacing portions of one set of supporting members forming the upper and lower wall of said pockets of the other set of supporting members, adjacent supporting members bearing against each other only at their centers, inwardly of said pockets, and where said spacing portions overlap at their peripheries; means holding said first and second sets of supporting members together to form a cylindrical assembly; and means supporting said cylindrical assembly for rotation about its axis of symmetry.

2. A storage receptacle for disc-like objects which includes: a first set of supporting members each of which is substantially flat and generally circular in shape, with a plurality of radial pockets therein extending from its periphery toward but not to its center, each of said pockets being adapted to receive one of said disc-like objects, and being separated from its adjacent pockets by a spacing member; a second set of supporting members each of which is similar to said first set, the members of said second set being angularly displaced from those of said first set so that the pockets of said second set are midway between the pockets of said first set, and said spacing members of one set acting as upper and lower walls of said pockets of the other set, said members of said first set being alternated with said members of said second set; means holding said first and second sets of supporting members together to form a generally cylindrical assembly having its longitudinal axis vertical, said pockets extending horizontally inwardly from the cylindrical surface of said assembly; and means for supporting said assembly for rotation about its longitudinal axis.

3. A device as described in claim 1 in which said spacing members of said first set of supporting members overlap said spacing members of said second set of supporting members near the periphery of said assembly to space apart adjacent members of each of said sets, the overlapping portions of said spacing members thus forming a solid portion extending axially along the periphery of said assembly.

FLORIAN K. MARTINI.

REFERENCES CITED

The following references are of record in the file of this patent:

UNITED STATES PATENTS

| Number | Name | Date |
|---|---|---|
| 925,236 | Sentell | June 15, 1909 |
| 1,419,487 | Blocker | June 13, 1922 |
| 1,572,454 | Vastola | Feb. 9, 1926 |

FOREIGN PATENTS

| Number | Country | Date |
|---|---|---|
| 609,125 | Germany | Jan. 24, 1935 |